(12) United States Patent  
Moon

(10) Patent No.: US 10,515,566 B2  
(45) Date of Patent: Dec. 24, 2019

(54) ELECTRONIC SYSTEM AND METHOD FOR MARTIAL ARTS MOVEMENT-BASED LANGUAGE CHARACTER SYMBOLIZATION AND EDUCATION

(71) Applicant: Jang Suk Moon, San Francisco, CA (US)

(72) Inventor: Jang Suk Moon, San Francisco, CA (US)

( * ) Notice: Subject to any disclaimer, the term of this patent is extended or adjusted under 35 U.S.C. 154(b) by 272 days.

(21) Appl. No.: 15/599,412

(22) Filed: May 18, 2017

(65) Prior Publication Data

US 2017/0345335 A1 Nov. 30, 2017

Related U.S. Application Data

(60) Provisional application No. 62/343,006, filed on May 29, 2016.

(51) Int. Cl.
| | |
|---|---|
| *G09B 19/06* | (2006.01) |
| *G09B 5/02* | (2006.01) |
| *G06K 9/00* | (2006.01) |
| *G06K 9/46* | (2006.01) |

(52) U.S. Cl.
CPC ......... *G09B 19/06* (2013.01); *G06K 9/00342* (2013.01); *G06K 9/46* (2013.01); *G09B 5/02* (2013.01)

(58) Field of Classification Search
CPC ...... G09B 21/009; G09B 19/06; G09B 21/00; G09B 19/00; G09B 5/02; G06F 3/017; G06F 3/014; G06K 9/00355; G06K 9/00335; G06K 9/00342; G06K 9/46
See application file for complete search history.

(56) References Cited

U.S. PATENT DOCUMENTS

| | | | | |
|---|---|---|---|---|
| 2011/0234384 A1* | 9/2011 | Agrawal | ............. | G09B 21/009 340/10.5 |
| 2011/0275045 A1* | 11/2011 | Bhupathi | ............. | G09B 19/003 434/247 |
| 2015/0084859 A1* | 3/2015 | Itzhaik | .................... | G06F 3/017 345/156 |
| 2017/0232299 A1* | 8/2017 | Trishaun | ............ | G01C 19/5776 434/250 |

\* cited by examiner

*Primary Examiner* — Jerry-Daryl Fletcher
(74) *Attorney, Agent, or Firm* — Invent Capture, LLC.; Samuel S. Cho

(57) ABSTRACT

A novel electronic language education system device is configured to define, instruct, analyze, and evaluate martial arts movements as characters of a particular language. In one embodiment, the novel electronic language education system includes a martial arts movement linguistic symbolization module and a martial arts movement-to-language character evaluation module that are executed on a CPU and a memory unit of the novel electronic language education system. Preferably, the system further incorporates a visual detection sensor, a gyroscopic sensor, a human limb movement sensor, and/or another sensor to enable capturing and analysis of a martial arts movement routine to create, match, and/or evaluate a digital symbolic key representing the martial arts movement routine, which is digitally paired with a character of the particular language. Ideally, a paired martial arts movement routine resembles the pen stroke or the shape of the character of the particular language to enhance linguistic learning experience.

12 Claims, 10 Drawing Sheets

An Embodiment of Electronic Symbolization of Multiple-Sequence Martial Arts Movements per Language Character in an Electronic Language Education System Device
200

An Embodiment of Electronic Symbolization of Single-Motion Martial Arts Movement to Language Characters in an Electronic Language Education System Device

100

201A     201B     201C     201D     KIYUK 203A     203B     203C     203D     NIEUN 205A     205B     205C     205D     DIGUT 207A     207B     207C     207D     LIEUL

An Embodiment of Electronic Symbolization of Multiple-Sequence Martial Arts Movements per Language Character in an Electronic Language Education System Device

200

An Example of an Electronic Language Education System Device

600

An Embodiment of a Martial Arts Movement Linguistic Symbolization Module

700

An Embodiment of a Martial Arts Movement-To-Language Character Evaluation Module

800

An Operational Flowchart for Martial Arts Movement-to-Language Character Electronic Symbolization and Creation in an Electronic Language Education System Device

900

An Operational Flowchart for Martial Arts Movement-to-Language Character Evaluation Mode in an Electronic Language Education System Device

1000

ELECTRONIC SYSTEM AND METHOD FOR MARTIAL ARTS MOVEMENT-BASED LANGUAGE CHARACTER SYMBOLIZATION AND EDUCATION

BACKGROUND OF THE INVENTION

The present invention generally relates to electronic systems and methods that enhance linguistic learning and education. In particular, the present invention relates to electronic systems and methods of operating such electronic systems for martial arts movement-based language character symbolization and education.

Martial arts classes have become increasingly popular forms of physical, mental, and cultural education around the world in recent decades. Learning various types of martial arts in today's globalized societies often go well beyond the boundaries of their origins. In case of childhood education, for example, a martial arts class (e.g. a Taekwondo class, a Hapkido class, a Judo class, etc.) can serve as a first or primary gateway for physical, mental, and cultural experience associated with a country of its origin. If one or a sequence of physical movements can be devised as a uniquely-intuitive process for learning a foreign language associated with the country of the martial arts' origin, the educational value of today's martial arts classes may be improved further for students of various backgrounds and ages. Moreover, if the sequence of physical movements by a martial arts student can be detected, evaluated, and converted by an electronic system to generate corresponding foreign language characters, phrases, or idioms, the effectiveness and efficiency of foreign language learning may be dramatically improved for the martial arts student over conventional methods of foreign language learning.

Therefore, it may be desirable to devise an electronic system for martial arts movement-based language character symbolization and education that can teach, analyze, and evaluate a student's particular martial arts move that uniquely symbolizes a letter or a character of a particular language defined by the electronic system. Furthermore, it may also be desirable to devise a method of operating an electronic system for martial arts movement-based language character symbolization and education that can teach, analyze, and evaluate a student's particular martial arts move that uniquely symbolizes a letter or a character of a particular language defined by the electronic system.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

An embodiment of the invention discloses a novel electronic system configured to demonstrate, instruct, analyze, and evaluate one or more sequences of martial arts movements that symbolize a letter or a character of a particular language defined by the novel electronic system.

In a preferred embodiment of the invention, an electronic language education system device is disclosed. This device comprises: a martial arts movement linguistic symbolization module configured to capture a martial arts movement performer's martial arts movement routine and generate a benchmark symbolic key representing the martial arts movement performer's martial arts movement routine, wherein the benchmark symbolic key is subsequently paired with a language character and stored together in a lookup table or in a relational database; a martial arts movement-to-language character evaluation module configured to capture a student's martial arts movement routine and generate an evaluation symbolic key representing the student's martial arts movement routine, wherein the evaluation symbolic key is entered into the lookup table or the relational database in an attempt to retrieve a corresponding language character as a return value; a camera lens connected to a camera processing unit to capture one or more digitized images associated with the martial arts movement performer's martial arts movement routine and the student's martial arts movement routine; a CPU and a memory unit to execute the martial arts movement linguistic symbolization module and the martial arts movement-to-language character evaluation module, wherein at least one module provides an electronic user interface to operate a martial arts movement-to-language character electronic symbolization and creation mode from the martial arts movement linguistic symbolization module and a martial arts movement-to-language character evaluation mode from the martial arts movement-to-language character evaluation module; and a display panel connected to the CPU and the memory unit to display at least one of menu choices, language characters, symbolized and paired datasets, and evaluation feedback as part of the electronic user interface.

Furthermore, the novel electronic system in accordance with an embodiment of the invention may include a martial arts movement linguistic symbolization module and a martial arts movement-to-language character evaluation module that are executed on a CPU and a memory unit of the novel electronic system. In this embodiment, the novel electronic system further incorporates at least one of a visual detection sensor (e.g. a camera lens, an infrared sensor, a laser distance measurement sensor, etc.), a gyroscopic sensor, a human limb movement sensor, or another sensor that are connected to the martial arts movement linguistic symbolization module and the martial arts movement-to-language character evaluation module.

Moreover, in one embodiment of the invention, the martial arts movement linguistic symbolization module enables a system user (a martial arts instructor, a program coordinator, an educator, etc.) to create, define, and correlate a specific martial arts movement (e.g. a left-arm face block, a right-arm middle body block, a right-arm middle punch, a left-leg frontal kick, a specially-designed move just for language character or letter learning, etc.) to a letter, a character, or an alphabet of a human language. For example, for a Taekwondo-based language learning application environment, the martial arts movement linguistic symbolization module in the novel electronic system may allow a Taekwondo instructor to create and define a specific Taekwondo movement and correlate the specific Taekwondo movement to a Korean letter (e.g. "ㄱ" (kiyuk), "ㄴ" (nieun), "ㄷ" (digut), etc.)).

In this example, creating and defining the specific Taekwondo movement may involve taking a video recording or a stationary graphical image of a Taekwondo instructor's specific Taekwondo movement from one or more visual and/or movement sensors, after which the martial arts movement linguistic symbolization module performs graphical feature extraction on the video recording and pair the extracted graphical features that represent the specific Taekwondo movement to a particular Korean letter. This electronic pairing achieves an intended novel effect of an electronic symbolization of the particular Korean letter by the specific Taekwondo movement.

Continuing with the example above, once the electronic symbolization between the specific Taekwondo movement and the particular Korean letter is created and paired in the novel electronic system, the martial arts movement-to-language character evaluation module can capture, analyze, and evaluate a student's Taekwondo movement to enhance the student's Korean linguistic skills. For example, the martial arts movement-to-language character evaluation module can display a Korean letter and prompt the student to perform a Taekwondo movement that symbolizes the Korean letter. The martial arts movement-to-language character evaluation module subsequently captures the student's physical movement via one or more sensors connected to the novel electronic system, and then compare against the previously-paired graphical features that were originally recorded and synthesized from the Taekwondo instructor's specific Taekwondo movement in the martial arts movement linguistic symbolization module. If the student's movement matches the Taekwondo instructor's movement associated and digitally paired with the displayed Korean letter, then the martial arts movement-to-language character evaluation module may generate an indicator (e.g. a textual or graphical display, an aural message, etc.) to signal that the student's movement was correct. On the other hand, if the student's movement does not match the Taekwondo instructor's movement associated and digitally paired with the displayed Korean letter, then the martial arts movement-to-language character evaluation module may generate an indicator to signal that the student's movement was incorrect.

In another example, the martial arts movement-to-language character evaluation module may first record and analyze the student's Taekwondo movement, and then generate a previously-paired and symbolized Korean letter on a display panel and/or pronounce the previously-paired and symbolized Korean letter associated with a particular Taekwondo movement.

Other embodiments of the invention may be utilized for other martial arts, such as Judo or Hapkido. Furthermore, one or more martial arts movement linguistic symbolization modules and martial arts movement-to-language character evaluation modules may be configured to analyze, evaluate, teach, and support other languages (e.g. Japanese, Chinese, etc.) associated with countries of origin for those martial arts.

In another embodiment of the invention, a method of operating the novel electronic system that can demonstrate, instruct, analyze, and evaluate one or more sequences of martial arts movements for symbolizing a letter or a character of a particular language is disclosed.

DETAILED DESCRIPTION

Figure 1:
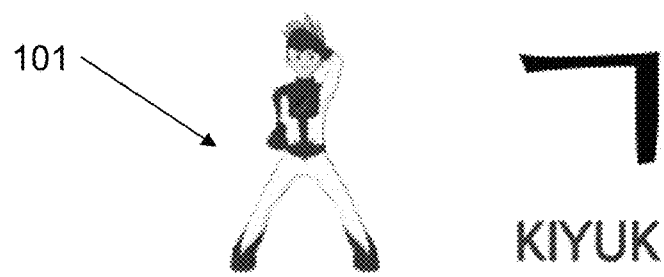
FIG. 1 shows an embodiment of electronic symbolization of single-motion martial arts movement to language characters in an electronic language education system device, in accordance with an embodiment of the invention.
Figure 1:
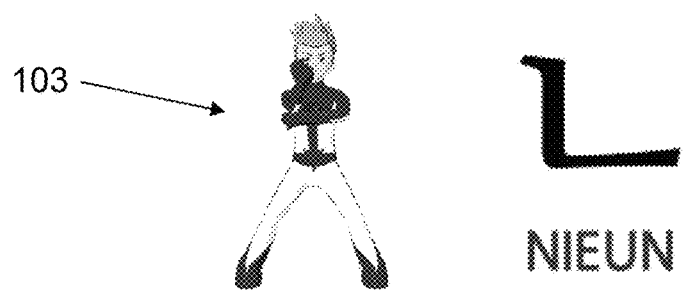
Figure 1:
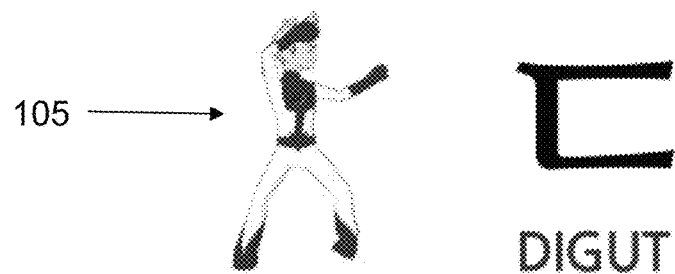
Figure 1:
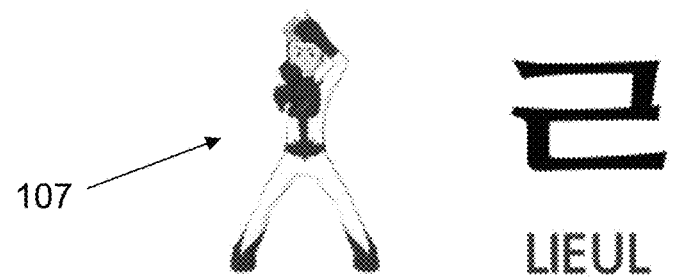

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more electronic systems and related operational methods for martial arts movement-based language character symbolization and education. Furthermore, the detailed descriptions also describe an electronic language education system device configured to provide martial arts movement-to-language character electronic symbolization and creation. Moreover, the detailed descriptions also describe an electronic language education system device configured to provide martial arts movement-to-language character evaluation. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "electronic language education system device" is defined as a special-purpose hardware set-top box for linguistic learning, a personal computer, a laptop computer, a tablet computer, a smart phone, a computer server, or another electronic device that is configured to contain and execute a martial arts movement linguistic symbolization module and/or a martial arts movement-to-language character evaluation module to provide a martial arts movement-sensing, linguistic character-symbolizing, and movement-evaluative environment for educational purposes. In one embodiment, the martial arts movement linguistic symbolization module and/or the martial arts movement-to-language character evaluation module may be software codes executed on a CPU/APU and a memory unit of the electronic language education system device. In an alternative embodiment, these modules may be hard-coded into a semiconductor chip, a graphical processing unit, or another piece of dedicated hardware part for incorporating the functionalities of the two modules.

Furthermore, in one embodiment, the electronic language education system device enables a user to define, select, and/or pair a particular character, alphabet, or letter in a human language with a particular martial arts movement. The electronic language education system device also enables a real-time evaluation of a user's martial arts movement via various visual and motion sensors and graphical feature point extraction algorithms to retrieve or recognize a particular character, alphabet, or letter of a human language that has been previously associated with the same martial arts movement. Preferably, the human language being paired and associated with one or more sequences of martial arts movement is the native language of the martial arts' origin (e.g. Korean for Taekwondo, Japanese for Karate, Mandarin Chinese for Kung Fu, etc.).

In addition, for the purpose of describing the invention, a term "character" is defined as a linguistic character (e.g. a Korean "Hangeul" character, a Chinese character, etc.), a linguistic letter (e.g. an English letter "A," a French letter "GN," etc.), or an alphabet (e.g. a Greek alphabet).

Moreover, for the purpose of describing the invention, a term "martial arts," is defined as a sport comprising a set of bodily movements or maneuvers for self-defense and/or attack against opponents or aggressors.

One aspect of an embodiment of the present invention is providing an electronic system for martial arts movement-based language character symbolization and education that can teach, analyze, and evaluate a student's particular martial arts move that uniquely symbolizes a letter or a character of a particular language defined by the electronic system.

Another aspect of an embodiment of the present invention is providing an electronic system that can create a digital symbolic key for a particular martial arts movement via graphical feature point extraction and generate a lookup table (LUT) or a relational database between the digital symbolic key for the particular martial arts movement and a user-selected linguistic character for subsequent evaluation of other users' martial arts movements.

Yet another aspect of an embodiment of the invention is providing a method of operating one or more such novel electronic systems for symbolic relations establishment and evaluation of various linguistic characters and martial arts movements for enhanced language learning.

FIG. 1 shows an embodiment of electronic symbolization (100) of single-motion martial arts movement to language characters in an electronic language education system device, in accordance with an embodiment of the invention. In this embodiment, a specific single-motion martial arts movement is assigned to a particular language character. For example, a first Korean language character, "ㄱ" (Kiyuk), is assigned to the single-motion "face block" move (101) in Taekwondo. Similarly, a second Korean language character, "ㄴ" (Nieun), is assigned to the single-motion "body block" move (103), while a third Korean language character, "ㄷ" (Digut), is assigned to the single-motion "face block and high punch" move (105) in Taekwondo. Likewise, a fourth Korean language character, "ㄹ" (Lieul), is assigned to the single-motion "face block and body block" move in Taekwondo. Preferably, a martial arts movement resembling the shape or the form of a particular language character may be the best candidate for this movement-to-character assignment process. Martial arts movements that closely resemble their assigned character counterparts may accommodate heuristic learning and memorization of language characters.

In a preferred embodiment of the invention, the martial arts movement-to-character assignment process is enabled by an electronic language education system device executing a martial arts movement linguistic symbolization module. The electronic language education system device incorporates a camera, a motion sensor, a pressure sensor, a position sensor, and/or other human movement-detecting sensors, and is configured to detect, capture, and record a user's single-motion martial arts movement. The digitized image of the user's single-motion martial arts movement then undergoes a graphical feature extraction process, which uniquely derives a set of graphical feature points. These derived graphical feature points can then be utilized as input variables to a symbolic mathematical function, which generates a unique symbolic key representing the user's single-motion martial arts movement. Subsequently, the unique symbolic key can then be "assigned," or digitally paired, with a particular language character selected or created by the user via a user interface menu generated by the electronic language education system device.

The user's single-motion martial arts movements (e.g. 101, 103, 105, 107), as shown in FIG. 1, may originate from a combination of multiple movements or multiple motions. However, for the purpose of describing various embodiments of the invention, each movement shown in FIG. 1 is considered a "single-motion" martial arts movement because the martial arts movement linguistic symbolization module executed by the electronic language education system device analyzes and extracts graphical feature points from a single "snapshot" of a particular martial arts movement to generate a corresponding symbolic key, which is subsequently paired with a particular language character, as shown by each movement in FIG. 1.

In a preferred embodiment of the invention, the paired dataset (i.e. a symbolic key for a particular martial arts movement and a particular language character) may be stored in a lookup table (LUT) or a relational database connected to or contained within the electronic language education system device. Furthermore, the paired dataset may be stored in a local data storage, a Cloud computing-based remote data storage, or both. Moreover, even though Taekwondo and Korean language characters were shown and described in FIG. 1 as part of the preferred embodiment of the invention, it should be appreciated that for one of ordinary skill in the art, other martial arts types and other language characters can undergo similar graphical feature extraction processes, symbolic key generation processes for single-motion martial arts movements, and digital data pairing processes to enable martial arts movement-based language learning in a variety of human languages.

Figure 2:
FIG. 2 shows an embodiment of electronic symbolization of multiple-sequence martial arts movements per language character in an electronic language education system device, in accordance with an embodiment of the invention.
Figure 2:
Figure 2:
Figure 2:
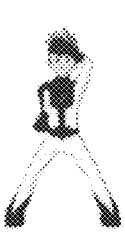
Figure 2:
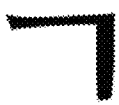
Figure 2:
Figure 2:
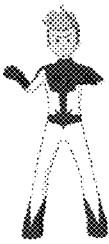
Figure 2:
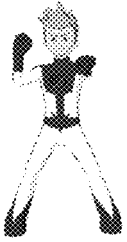
Figure 2:
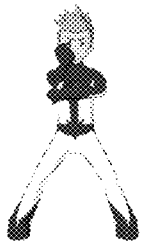
Figure 2:
Figure 2:
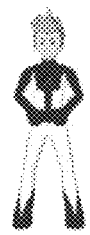
Figure 2:
Figure 2:
Figure 2:
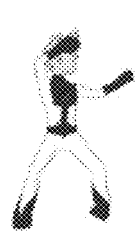
Figure 2:
Figure 2:
Figure 2:
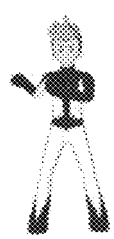
Figure 2:
Figure 2:
Figure 2:

FIG. 2 shows an embodiment of electronic symbolization (200) of multiple-sequence martial arts movements per language character in an electronic language education system device, in accordance with an embodiment of the invention. In this embodiment, a multiple-sequence martial arts movement routine (e.g. 201A~201D, 203A~203D, 205A~205D, 207A~207D, etc.) is assigned to a particular language character. For example, a first Korean language character, "ㄱ" (Kiyuk), is assigned to a first multiple-sequence martial arts movement routine for the "face block" move (i.e. 201A~201D) in Taekwondo.

Unlike the single-motion martial arts movement capture and symbolization previously described and shown in FIG. 1, the electronic symbolization (200) derived from the multiple-sequence martial arts movement routine involves detecting and capturing a sequence of multiple martial arts movement as a single routine (e.g. 201A, 201B, 201C, and 201D) as the basis for generating a symbolic key, which is subsequently assigned to and paired with a particular language character (e.g. "ㄱ" (Kiyuk)). In some embodiments, utilizing multiple-sequence martial arts movement routines for language character associations may further improve effectiveness of students' heuristics and muscle memory-oriented linguistic learning. Furthermore, utilizing multiple-sequence martial arts movement routines in the electronic language education system enables more dynamic and challenging learning and evaluative environments for students, compared to single-motion martial arts movements, as each student is required to memorize and perform multiple steps in sequence to correlate to a particular language character, which can be digitally symbolized and evaluated by the electronic language education system.

Continuing with the embodiment of the invention as shown in FIG. 2, a second Korean language character, "ㄴ" (Nieun), is assigned to a second multiple-sequence martial arts movement routine for the "body block" move (i.e. 203A~203D), while a third Korean language character, "ㄷ" (Digut), is assigned to a third multiple-sequence martial arts movement routine for the "face block and high punch" move (i.e. 205A~205D) in Taekwondo. Likewise, a fourth Korean language character, "ㄹ" (Lieul), is assigned to a fourth multiple-sequence martial arts movement routine for the "face block and body block" move (i.e. 207A~207D) in Taekwondo.

In a preferred embodiment of the invention, a multiple-sequence martial arts movement routine that resembles the pen stroke, the shape, and/or the form of a particular language character may be the best candidate for the multiple-sequence martial arts movement-to-character assignment process. Martial arts movement routines that closely resemble their assigned character counterparts may accommodate heuristic learning and memorization of language characters.

The multiple-sequence martial arts movement-to-character assignment process is enabled by an electronic language education system device executing a martial arts movement linguistic symbolization module. The electronic language education system incorporates a camera, a motion sensor, a pressure sensor, a position sensor, and/or other human movement-detecting sensors, and is configured to detect, capture, and record a user's multiple-sequence martial arts movement routine. A series of digitized images captured from the user's multiple-sequence martial arts movement routine then undergoes a graphical feature extraction process, which uniquely derives a set of graphical feature points. These derived graphical feature points can then be utilized as input variables to a symbolic mathematical function, which generates a unique symbolic key representing the user's multiple-sequence martial arts movement routine. Subsequently, the unique symbolic key can then be "assigned," or digitally paired, with a particular language character selected or created by the user via a user interface menu generated by the electronic language education system device.

In the preferred embodiment of the invention, the paired dataset (i.e. a symbolic key for a particular multiple-sequence martial arts movement routine and a particular language character) may be stored in a lookup table (LUT) or a relational database connected to or contained within the electronic language education system device. Furthermore, the paired dataset may be stored in a local data storage, a cloud computing-based remote data storage, or both. Moreover, even though Taekwondo and Korean language characters were shown and described in FIG. 2 as part of the preferred embodiment of the invention, it should be appreciated that for one of ordinary skill in the art, other martial arts types and other language characters can undergo similar graphical feature extraction processes, symbolic key generation processes for multiple-sequence martial arts movement routines, and digital data pairing processes to enable martial arts movement-based language learning in a variety of human languages.

Figure 3:
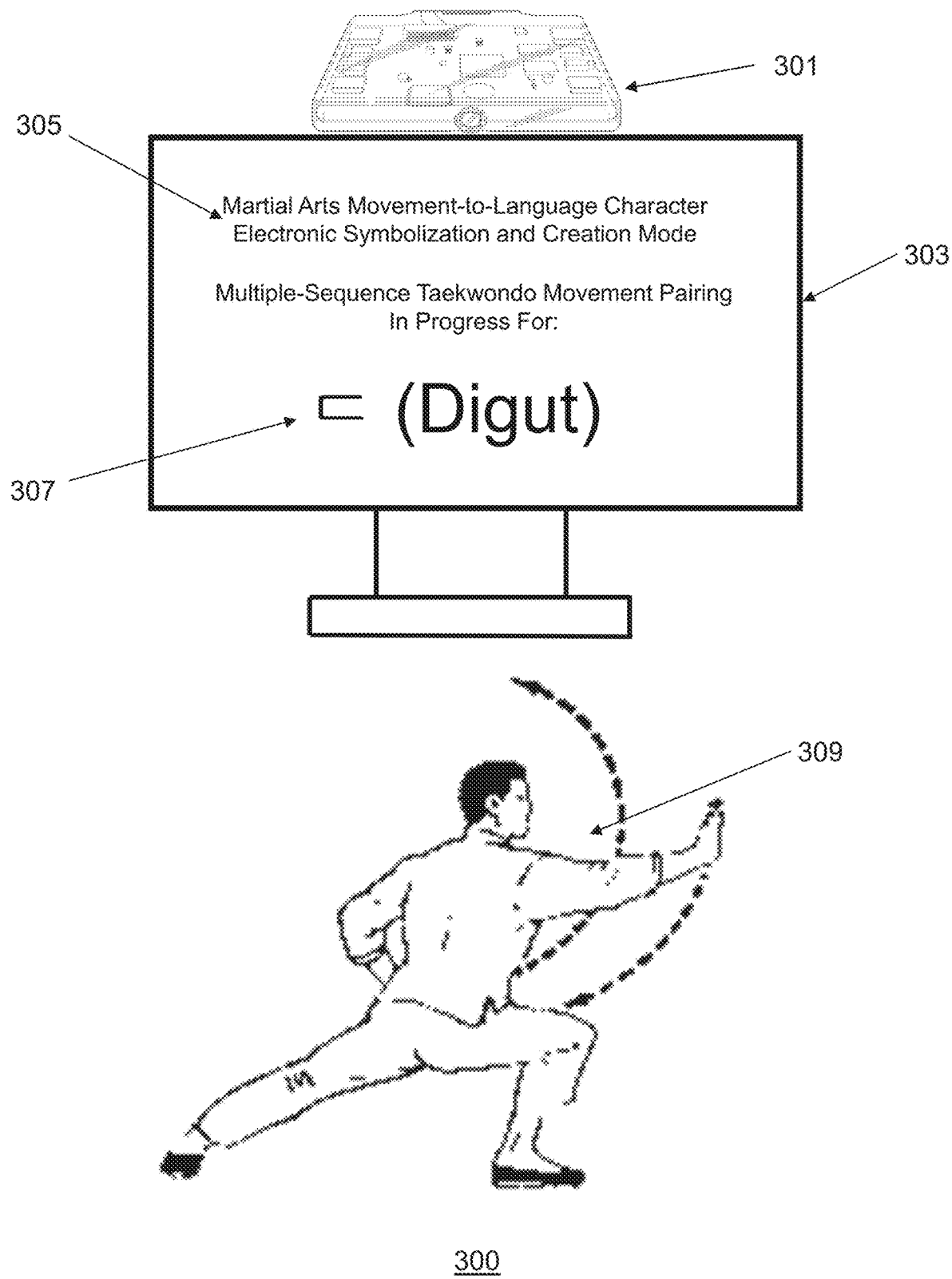
FIG. 3 shows a snapshot of a user interface and a martial arts movement performer for a martial arts movement-to-language character electronic symbolization and creation mode executed in an electronic language education system device, in accordance with an embodiment of the invention.

FIG. 3 shows a snapshot (300) of a user interface (i.e. 305, 307) and a martial arts movement performer (309) for a martial arts movement-to-language character electronic symbolization and creation mode executed in an electronic language education system device (301), in accordance with an embodiment of the invention. In this embodiment, the user interface comprises a symbolization and creation mode indicator (305) and a language character indicator (307) for the martial arts movement-to-language character electronic symbolization and creation mode. The electronic language education system device (301) is configured to contain and execute a martial arts movement linguistic symbolization module and/or a martial arts movement-to-language character evaluation module to provide the martial arts movement-to-language character electronic symbolization and creation mode and related electronic user interfaces.

As shown in FIG. 3, the electronic language education system device (301) that executes the martial arts movement-to-language character electronic symbolization and creation mode in its CPU and a memory unit may be a special-purpose "martial arts-based language education" set-top box with an integrated camera and/or visual and motion sensors. The special-purpose "martial arts-based language education" set-top box may be operatively connected to a display screen (303) that shows the user interface (i.e. 305, 307) associated with the martial arts movement-to-language character electronic symbolization and creation mode to the martial arts movement performer (309).

In other embodiments of the invention, the electronic language education system device (301) may be a personal computer, a laptop computer, a tablet computer, a smart phone, a computer server, or another electronic device that is configured to contain and execute a martial arts movement linguistic symbolization module and/or a martial arts movement-to-language character evaluation module to provide a martial arts movement-sensing, linguistic character-symbolizing, and movement-evaluative environment for educational purposes. In one embodiment, the martial arts movement linguistic symbolization module and/or the martial arts movement-to-language character evaluation module may be software codes executed on a CPU/APU and a memory unit of the electronic language education system device (301). In an alternative embodiment, these modules may be hard-coded into a semiconductor chip, a graphical processing unit, or another piece of dedicated hardware part for incorporating the functionalities of the two modules.

Furthermore, in one embodiment, the electronic language education system device (301) enables a user to define, select, and/or pair a particular character, alphabet, or letter in a human language with a particular martial arts movement. In context of the embodiment of the invention as shown in FIG. 3, the electronic language education system device (301) empowers the martial arts movement performer (309) to define, select, and pair a Korean language character, "ㄷ" (Digut), with a specific set of martial arts moves that the martial arts movement performer (309) intends to symbolize electronically to represent the chosen Korean language character, "ㄷ" (Digut).

In one embodiment, a specific set of martial arts moves may be a single-motion martial arts movement (e.g. 105 of FIG. 1) or multi-sequence martial arts movements (e.g. 205A~205 D) that are captured by one or more sensors incorporated into or connected to the electronic language education system device (301) and further processed by the martial arts movement linguistic symbolization module to dynamically pair the specific set of martial arts moves with a user-chosen language character to symbolize that language character.

The martial arts movement linguistic symbolization module executed by the electronic language education system device (301) is configured to symbolize and pair a digitized stream of visual information captured by a visual detection sensor, a gyroscopic sensor, a human limb movement sensor, and/or another sensor that are incorporate into or connected to the electronic language education system device (301).

In the example as shown in FIG.3, the martial arts movement-to-language character electronic symbolization and creation mode is operated and managed by the martial arts movement linguistic symbolization module, which generates the user interface (i.e. 305, 307) to record, symbolize, and pair the specific set of martial arts moves performed by the martial arts movement performer (309) with a user-selected language character (e.g. "ㄷ" (Digut)). The symbolization and creation mode indicator (305) displays that the martial arts movement-to-language character electronic symbolization and creation mode is currently active to record, symbolize, and pair a live performance of specific martial arts movement(s) with a user-selected language character. Furthermore, the language character indicator (307) displays the user-selected language character currently being paired with a digitized symbolic key representation of the specific martial arts movement(s) captured from the live performance by the martial arts movement performer (309).

In a preferred embodiment of the invention, the martial arts movement linguistic symbolization module enables a system user (a martial arts instructor, a program coordinator, an educator, etc.) to create, define, and correlate a specific martial arts movement (e.g. a left-arm face block, a right-arm middle body block, a right-arm middle punch, a left-leg frontal kick, a specially-designed move just for language character or letter learning, etc.) to a letter, a character, or an alphabet of a human language. For example, for a Taekwondo-based language learning application environment, the martial arts movement linguistic symbolization module in the novel electronic system may allow a Taekwondo instructor to create and define a specific Taekwondo movement and correlate the specific Taekwondo movement to a Korean letter (e.g. "ㄱ" (kiyuk), "ㄴ" (nieun), "ㄷ" (digut), etc.)).

In this example, creating and defining the specific Taekwondo movement may involve taking a video recording or a stationary graphical image of a Taekwondo instructor's specific Taekwondo movement from one or more visual and/or movement sensors, after which the martial arts movement linguistic symbolization module performs graphical feature extraction on the video recording and pair the extracted graphical features that represent the specific Taekwondo movement to a particular Korean letter. This electronic pairing achieves an intended novel effect of an electronic symbolization of the particular Korean letter by the specific Taekwondo movement.

Continuing with the example above, once the electronic symbolization between the specific Taekwondo movement and the particular Korean letter is created and paired in the novel electronic system, the martial arts movement-to-language character evaluation module can capture, analyze, and evaluate a student's Taekwondo movement to enhance the student's Korean linguistic skills. The novel aspects of the invention associated with the martial arts movement-to-language character evaluation module are further elaborated in FIGS. 4-5 and in related descriptions below.

Figure 4:
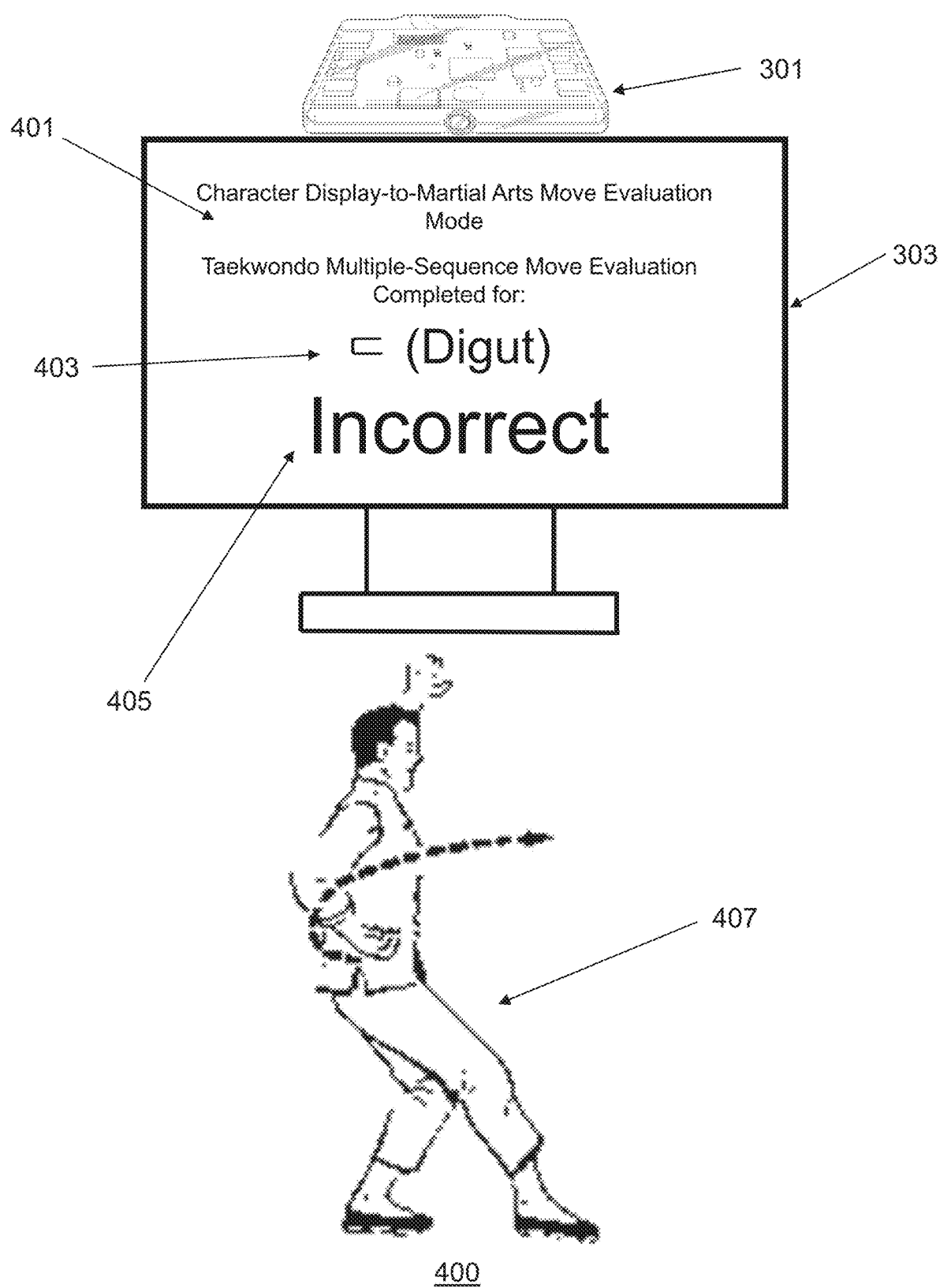
FIG. 4 shows a snapshot of a user interface and a martial arts movement performer for a character display-to-martial arts move evaluation mode in an electronic language education system device, in accordance with an embodiment of the invention.

FIG. 4 shows a snapshot (400) of a user interface (i.e. 401, 403) and a martial arts movement student (407) for a character display-to-martial arts move evaluation mode in an electronic language education system device (301), in accordance with an embodiment of the invention. In this embodiment, the martial arts movement-to-language character evaluation module is executed and operated by the electronic language education system device (301), and provides the character display-to-martial arts move evaluation mode to generate and display a Korean letter from a language character indicator for martial arts performance (403) and related status information from a character display-to-martial arts move evaluation mode indicator (401) on the display screen (303), as shown in FIG. 4. The character display-to-martial arts move evaluation mode also generates the user interface (i.e. 401, 403) to prompt the student to perform a Taekwondo movement that symbolizes the Korean letter displayed on the language character indicator for martial arts performance (403).

The martial arts movement-to-language character evaluation module subsequently captures the martial arts student's (407) physical movement via one or more sensors connected to the novel electronic system, and then compares against the previously-paired graphical features that were originally recorded, symbolized, and synthesized from the Taekwondo instructor's specific Taekwondo movement in the martial arts movement linguistic symbolization module, as shown previously in FIG. 3. If the martial arts student's (407) movement matches the Taekwondo instructor's movement, which was previously associated and digitally paired with the displayed Korean letter, then the martial arts movement-to-language character evaluation module may generate an indicator (e.g. a textual or graphical display, an aural message, etc.) to signal that the martial arts student's movement was correct. On the other hand, if the martial arts student's movement does not match the Taekwondo instructor's movement, which was previously associated and digitally paired with the displayed Korean letter, then the martial arts movement-to-language character evaluation module may generate an indicator to signal that the martial arts student's movement was incorrect.

In the snapshot (400) example of FIG. 4, the character display-to-martial arts move evaluation mode operated by the martial arts movement-to-language character evaluation module in the electronic language education system device (301) determines that the martial arts student's (407) movement does not match with the previously-defined symbolized movement for the Korean language character, Digut (" ㄷ "), and thus displays an output message, "Incorrect," on a martial arts movement evaluation indicator (405) to signal that the martial arts student's movement was incorrect.

By digitally correlating specific language characters to martial arts movements, prompting martial arts students to perform those movements, and evaluating correctness of the students' movements, the electronic language education system device (301) disclosed in various embodiments of the present invention can enhance students' foreign language learning through motion and muscle memory.

Figure 5:
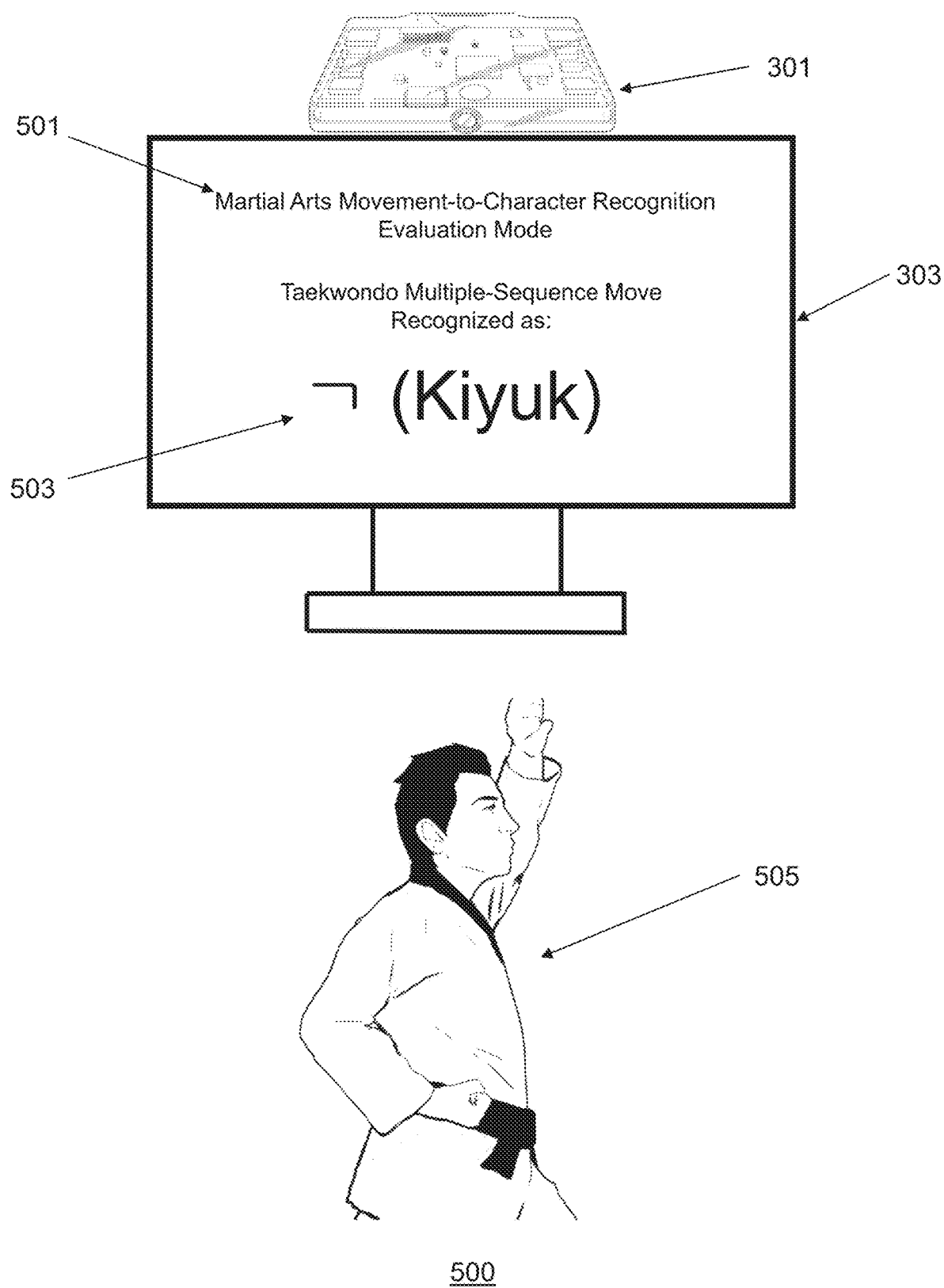
FIG. 5 shows a snapshot of a user interface and a martial arts movement performer for a martial arts movement-to-character recognition evaluation mode executed in an electronic language education system device, in accordance with an embodiment of the invention.

FIG. 5 shows a snapshot (500) of a user interface (i.e. 501, 503) and a martial arts student (505) for a martial arts movement-to-character recognition evaluation mode executed in an electronic language education system device (301), in accordance with an embodiment of the invention. For the martial arts movement-to-character recognition evaluation mode, as shown in FIG. 5, the martial arts movement-to-language character evaluation module may first record and analyze the martial arts student's (505) Taekwondo movement, and then generate a previously-paired and symbolized Korean letter, Kiyuk (" ㄱ "), on the display screen (303) and/or pronounce the previously-paired and symbolized Korean letter associated with a particular Taekwondo movement.

In this embodiment, the martial arts movement-to-language character evaluation module is executed and operated by the electronic language education system device (301), and provides the martial arts movement-to-character recognition evaluation mode to capture the martial arts student's (505) Taekwondo movement. An evaluation status indicator (501) may display a particular evaluation mode and its current progress, as shown in FIG. 5. If the martial arts student's (505) Taekwondo movement is recognized and matched successfully with a language character that was previously defined and digitally paired with a particular sequence of Taekwondo movement(s), then the matching language character (e.g. Kiyuk (" ㄱ ")) is displayed on a language character recognition indicator (503), which may be part of a computerized user interface displayed on the display screen (303), as illustrated in FIG. 5. On the other hand, if the martial arts student's (505) Taekwondo movement does not match up with any known or pre-defined sets of digitized symbolizations for stored language characters in the electronic language education system device (301), then the language character recognition indicator (503) displays a message indicating that the martial arts student's (505) Taekwondo movement is unrecognized by the martial arts movement-to-character recognition evaluation mode.

Furthermore, the martial arts movement-to-character recognition evaluation mode also generates the computerized user interface (i.e. 501, 503) to instruct the martial arts student (505) to perform a Taekwondo movement, which is subsequently captured and processed by the electronic language education system device (301) to find a matching symbolization for a particular language character previously defined and associated with the same sequence of the Taekwondo movement. In a preferred embodiment of the invention, the martial arts movement-to-language character evaluation module is configured to capture the martial arts student's (505) physical movement via one or more sensors connected to the electronic language education device (301), which subsequently compares the captured and/or transformed video data against the previously-paired graphical features that were originally recorded, symbolized, and synthesized from the Taekwondo instructor's specific Taekwondo movement in the martial arts movement linguistic symbolization module, as shown previously in FIG. 3.

By digitally correlating specific language characters to benchmark martial arts movements performed by a martial arts instructor, prompting a martial arts student to perform a martial arts movement, capturing the martial arts movement performed by the student, and attempting to match the digitally-symbolized representation of the student's martial arts movement with a digitally-symbolized representation of one of the benchmark martial arts movements performed by the martial arts instructor, the martial arts movement-to-character recognition evaluation mode as disclosed in FIG. 5 further enhances the student's foreign language learning through motion and muscle memory.

In addition, other embodiments of the invention may be utilized for other martial arts, such as Judo or Hapkido. Furthermore, one or more martial arts movement linguistic symbolization modules and martial arts movement-to-language character evaluation modules may be configured to analyze, evaluate, teach, and support other languages (e.g. Japanese, Chinese, etc.) associated with countries of origin for those martial arts.

Moreover, the electronic language education system device (301) also enables a real-time evaluation of a user's martial arts movement via various visual and motion sensors and graphical feature point extraction algorithms to retrieve or recognize a particular character, alphabet, or letter of a human language that has been previously associated with the same martial arts movement. Preferably, the human language being paired and associated with one or more sequences of martial arts movement is the native language of the martial arts' origin (e.g. Korean for Taekwondo, Japanese for Karate, Mandarin Chinese for Kung Fu, etc.).

Figure 6:
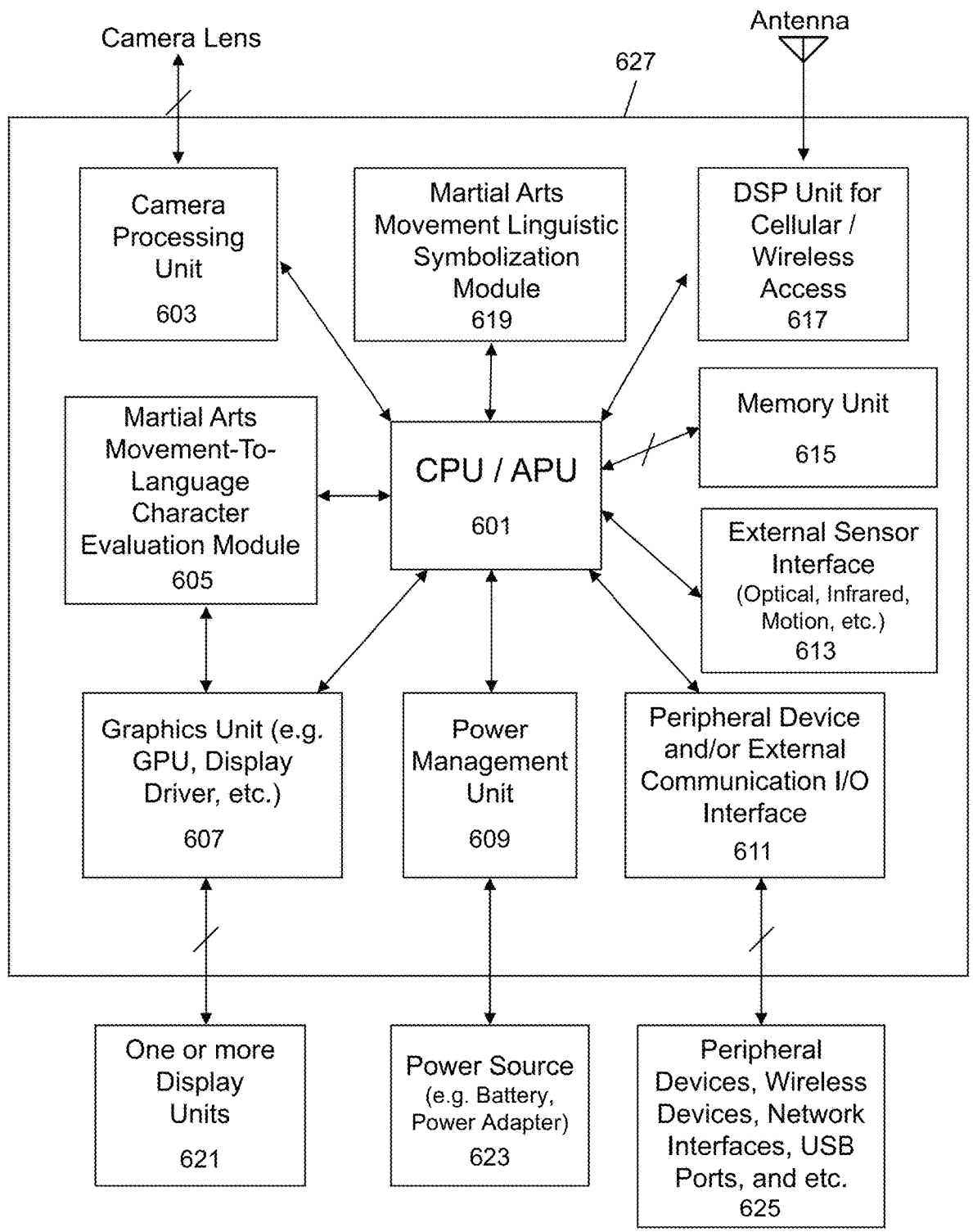
FIG. 6 shows an example of an electronic language education system device, in accordance with an embodiment of the invention.

FIG. 6 shows a system block diagram example of an electronic language education system device (600), in accordance with an embodiment of the invention. The electronic language education system device (600) may be a specialized language education electronic set-top box, a portable electronic device, a wearable electronic device, a personal computer, a kiosk, or a smart television. In a preferred embodiment of the invention, the electronic language education system device (600) contains a martial arts movement linguistic symbolization module (619) and a martial arts movement-to-language character evaluation module (605), which have been described in association with other figures previously.

In a preferred embodiment of the invention, the block diagram of the electronic language education system device (600) incorporates a central processing unit (CPU) (601) or an application processor unit (APU), which is operatively connected to a memory and/or data storage unit (615), an external sensor interface (613) for connecting to optical, infrared, and motion sensors, a camera processing unit (603) connected to a camera lens, a graphics unit (607) (e.g. a graphics processor, a display driver, and etc.), a power management unit (609), a peripheral device and/or external communication I/O interface (611), a digital signal processing (DSP) unit for cloud server access (617), the martial arts movement-to-language character evaluation module (605), the martial arts movement linguistic symbolization module (619), and an audio recording and processing unit, which is operatively connected to a microphone and one or more speakers. These logical units may be placed on a single printed circuit board (627) in one embodiment of the invention, or on a plurality of printed circuit boards in another embodiment of the invention.

In the preferred embodiment of the invention, the CPU/APU (601) is configured to control each logical unit operatively (i.e. directly or indirectly) connected to the CPU/APU (601). The memory and/or data storage unit (615) typically comprises volatile memory banks based on DRAM's. In some embodiments of the invention, the memory and/or data storage unit (615) may use non-volatile memory technologies such as SRAM's and/or Flash memory. The memory and/or data storage unit (615) is capable of storing programs, applications, and/or multimedia files that can be executed by the CPU/APU (601), the graphics unit (607), or another logical unit operatively connected to the memory and/or data storage unit (615). Furthermore, in the preferred embodiment of the invention, the martial arts movement-to-language character evaluation module (605) and the martial arts movement linguistic symbolization module (619) executed on the CPU/APU (601) and the memory and/or data storage unit (615) of the electronic system provide martial arts movement-based linguistic symbolization functions as well as martial arts movement-to-language character evaluation features.

Moreover, in the preferred embodiment of the invention, the electronic language education system device (600) is capable of performing data encryption, decryption, graphical rendering, and various multimedia format conversions and processing by utilizing the CPU/APU (601), the graphics unit (607), and/or another logical unit operatively connected to the memory and/or data storage unit (615). In addition, in the preferred embodiment of the invention, a touchscreen sensor interface may be connected to the CPU/APU (601) and one or more display units (621), which may embed capacitive or other types of touch sensors to detect user touch inputs and gestures. The touchscreen sensor interface is configured to read and interpret touch sensor values transmitted from the one or more display units (621). In some embodiments of the invention, pressure sensing may provide an additional dimension of user control for martial arts movement-based linguistic symbolization and martial arts movement-to-language character conversion electronic user commands by interpreting various pressure levels of the user input. For example, a user may define opacity (i.e. transparency or translucency levels) of a viewing window by changing finger pressures on the user interface during martial arts movement recording or linguistic character recognition processes. In this example, a stronger finger pressure may turn the viewing window more opaque, while a lighter finger pressure may transition the viewing window to be more transparent. Furthermore, in some embodiments, an air gesture sensor may also be connected to the external sensor interface (613) to support air gestures for linguistic symbolization or character recognition commands. Moreover, the electronic language education system device (600) as illustrated in FIG. 6 may also provide data encryption, decryption, compression, decompression, and conversion based on security and QoS requirements of incoming or outgoing multimedia contents.

Continuing with the embodiment of the invention as shown in FIG. 6, any software and programs originating from one or more modules and executed on the CPU/APU (601) and the memory and/or data storage unit (615) of the electronic language education system device (600) may be part of an operating system, or a separate application installed on the operating system of the electronic system.

Furthermore, in this particular embodiment, the camera processing unit (603) is operatively connected to a camera lens on the electronic language education system device (600), and is able to process real-time image-related data from the camera lens via the CPU/APU (601) and/or other logical units in the electronic system to provide a camera lens-captured multimedia video feed that can be utilized in martial arts movement linguistic symbolization processes or martial arts movement-to-language character evaluation processes. Moreover, in some embodiments, the microphone operatively connected to the audio recording and processing unit can produce live recorded audio content from martial arts students or instructors, which can also be utilized in martial arts movement linguistic symbolization processes or martial arts movement-to-language character evaluation processes.

Furthermore, as shown in FIG. 6, in the preferred embodiment of the invention, the digital signal processing (DSP) unit for cloud server access (617) is operatively connected to an radio frequency (RF) antenna. The DSP unit for cloud server access (617) is generally configured to receive and transmit multimedia data and/or voice signals wirelessly for a dedicated electronic language education system set-top box, a mobile communication device, a wireless audio system, a smart television, an electronic goggle, or another suitable electronic system. In addition, the electronic language education system device (600) is also configured to communicate via a physical wired connection, such as an Ethernet cable or a fiber optic cable. In addition, the power management unit (609) is operatively connected to a power supply unit and a power source (e.g. battery, power adapter) (623), and the power management unit (609) generally controls power supplied to the electronic language education system device (600). Moreover, the peripheral device and/or external communication I/O interface (611) can be operatively connected to one or more peripheral devices, wireless devices (e.g. WiLAN, Bluetooth, SonosNet, etc.), USB ports, USB-enabled devices, and other external data communication media (625).

Continuing with the embodiment of the invention shown in FIG. 6, the graphics unit (607) in the system block diagram for the electronic language education system device (600) comprises a graphics processor, a display driver, a dedicated graphics memory and/or data storage unit, and/or another graphics-related logical components. In general, the graphics unit (607) is able to process and communicate graphics-related data with the CPU/APU (601), the display driver, and/or the dedicated graphics memory and/or data storage unit. The graphics unit (607) is also operatively connected to one or more display units (621) and is operatively connected to video in/out ports, an HDMI interface, and/or another multimedia port.

Figure 7:
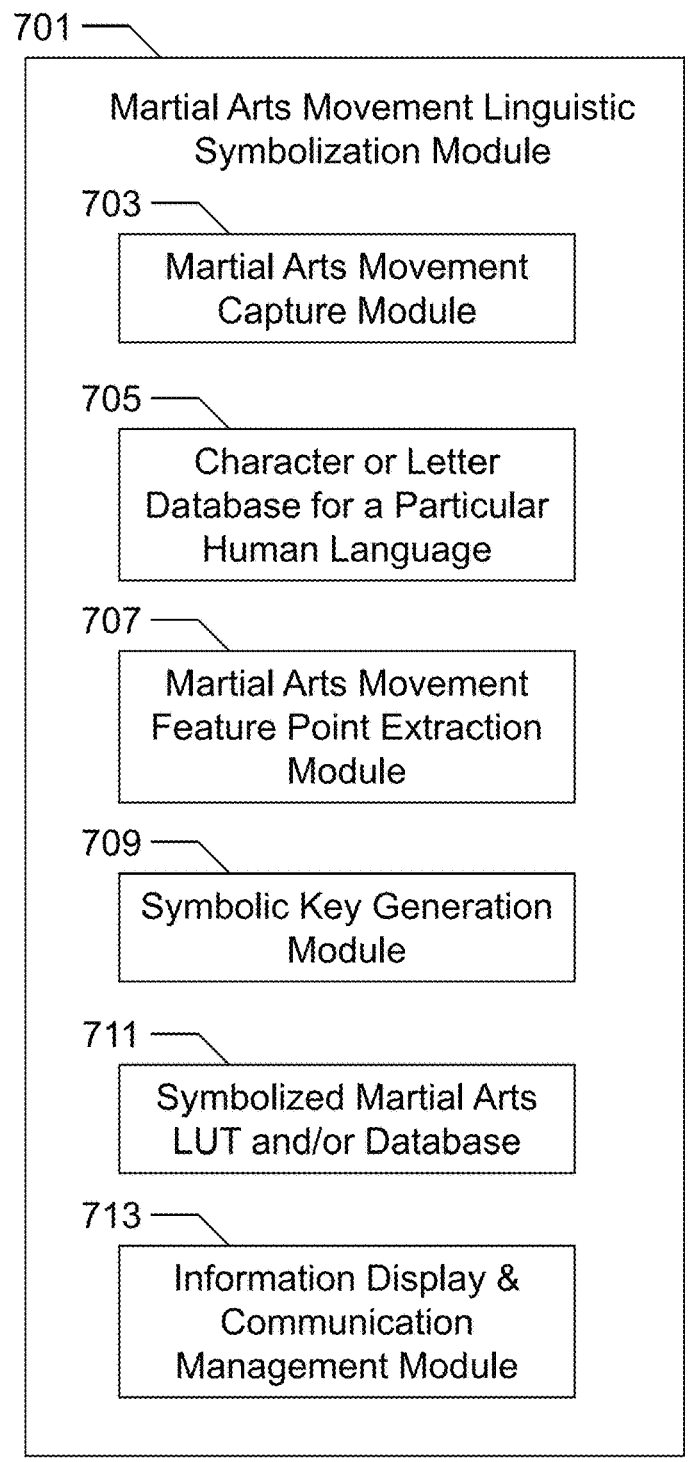
FIG. 7 shows an embodiment of a martial arts movement linguistic symbolization module, in accordance with an embodiment of the invention.

FIG. 7 shows an embodiment (700) of a martial arts movement linguistic symbolization module (701), in accordance with an embodiment of the invention. In this example, the martial arts movement linguistic symbolization module (701) comprises a martial arts movement capture module (703), a character or letter database for a particular human language (705), a martial arts movement feature point extraction module (707), a symbolic key generation module (709), a symbolized martial arts lookup table (LUT) and/or database (711), and an information display and communication management module (713). The martial arts movement capture module (703) is configured to record a martial arts instructor's movements and convert them into digitized data. The digitized data then underdoes graphical feature point extraction in the martial arts movement feature point extraction module (707). Based on a particular character or a letter selected by a user or by an artificial-intelligence program executed in an electronic language education system device, the extracted graphical feature points originating from the captured martial arts movement and the selected particular character or the letter are digitally paired up for storage in the symbolized martial arts LUT and/or database (711).

In the preferred embodiment of the invention, the character or letter database for the particular human language (705) typically stores a plurality of human language letter or characters that can be accessed by the user for initiating the martial arts movement linguistic symbolization process. Preferably, a symbolic key is generated during the data-paring process in the symbolic key generation module (709), wherein the symbolic key is subsequently utilized to lookup the paired dataset that incorporates or links the extracted graphical feature points associated with the captured martial arts movement and the selected particular character or the letter of the particular human language. Furthermore, as shown in FIG. 7, the information display and communication management module (713) is configured to take user commands or input and display pertinent information on a display screen connected to the electronic language education system device. Examples of such displayed information have been previously shown and described for FIG. 3.

Figure 8:
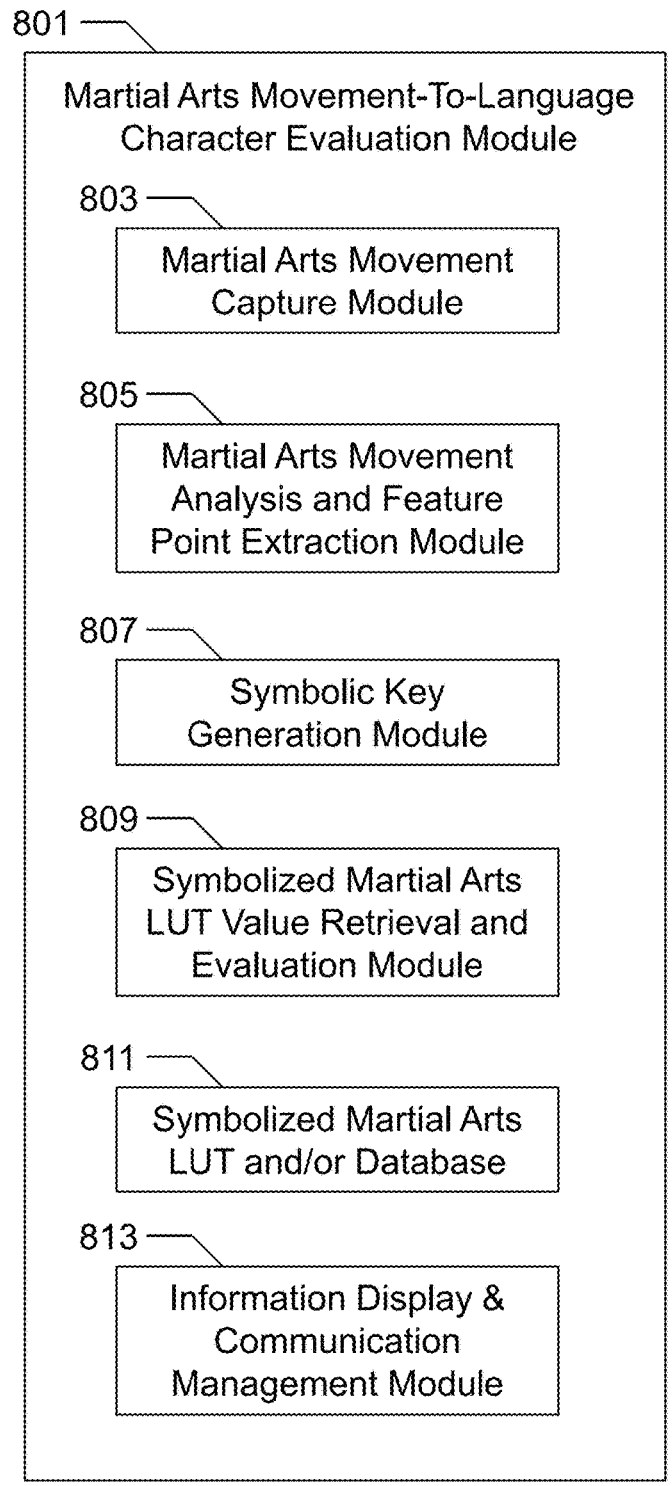
FIG. 8 shows an embodiment of a martial arts movement-to-language character evaluation module, in accordance with an embodiment of the invention.

FIG. 8 shows an embodiment (800) of a martial arts movement-to-language character evaluation module (801), in accordance with an embodiment of the invention. In this example, the martial arts movement-to-language character evaluation module (801) comprises a martial arts movement capture module (803), a martial arts movement analysis and feature point extraction module (805), a symbolic key generation module (807), a symbolized martial arts lookup table (LUT) value retrieval and evaluation module (809), a symbolized martial arts LUT and/or database (811), and an information display and communication management module (813).

The martial arts movement capture module (803) is configured to record a martial arts student's movements and convert them into digitized data. The digitized data then underdoes graphical feature point extraction in the martial arts movement analysis and feature point extraction module (805). The extracted graphical feature points from the martial arts student's movements are subsequently analyzed by the martial arts movement analysis and feature point extraction module (805) to match with a known symbolic key that has been previously paired with a particular language character linked to previously-extracted graphical feature points of the martial arts instructor's movements from the martial arts movement linguistic symbolization module. The symbolic key generation module (807) is configured to generate a new symbolic key from the extracted graphical feature points of the martial arts student's movements, after which the new symbolic key is entered queried into the symbolized martial arts LUT value retrieval and evaluation module (809) in an attempt to retrieve the particular language character linked to the previously-extracted graphical feature points of the martial arts instructor's movements.

As shown in FIG. 8, data associations among various language characters, martial arts movements, and symbolic keys may be maintained and updated by the symbolized martial arts LUT and/or database (811), wherein a particular symbolic key generated by capturing, transforming, and interpreting the martial arts student's movements may be queried into the symbolized martial arts LUT and/or database (811) to retrieve a language character associated with a particular martial arts movement. If the particular symbolic key has existing data pairing in the symbolized martial arts LUT and/or database (811), then the language character associated with the particular martial arts movement is identified and retrieved by the symbolized martial arts LUT value retrieval and evaluation module (809). On the other hand, if the particular symbolic key is not found to have any existing data pairing in the symbolized martial arts LUT and/or database (811), then the symbolized martial arts LUT value retrieval and evaluation module (809) determines that the martial arts student's movements do not have any existing language character/letter associations. This may also indicate that the martial arts student's movements are incorrectly-performed or unrecognizable by the martial arts movement-to-language character evaluation module in the electronic language education system device.

Furthermore, as shown in FIG. 8, the information display and communication management module (813) in the martial arts movement-to-language character evaluation module (801) is configured to take user commands or input and display pertinent information on a display screen connected to the electronic language education system device. Examples of such displayed information have been previously shown and described for FIG. 4 and FIG. 5.

Figure 9:
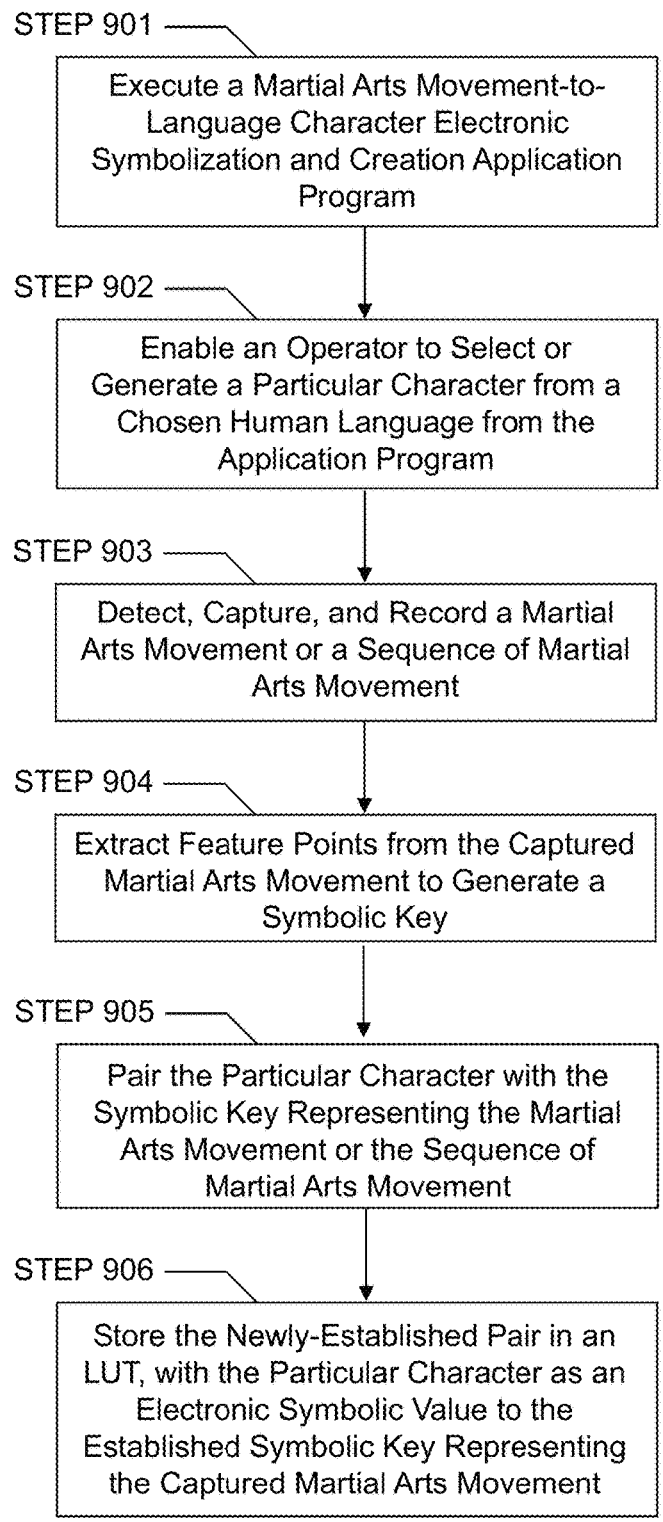
FIG. 9 shows an embodiment of an operational flowchart for martial arts movement-to-language character electronic symbolization and creation in an electronic language education system device, in accordance with an embodiment of the invention.

FIG. 9 shows an embodiment of an operational flowchart (900) for martial arts movement-to-language character electronic symbolization and creation in an electronic language education system device, in accordance with an embodiment of the invention. In this embodiment, a user first executes a martial arts movement-to-language character electronic symbolization and creation application program, as shown in STEP 901. Then, the electronic language education system device enables an operator, via a user interface, to select or generate a particular character of a chosen human language from the martial arts movement-to-language character electronic symbolization and creation application program, as shown in STEP 902.

Subsequently, the martial arts movement-to-language character electronic symbolization and creation application program detects, captures, and records a martial arts movement or a sequence of martial arts movement, as shown in STEP 903. Then, the martial arts movement-to-language character electronic symbolization and creation application program extracts feature points from the captured martial arts movement to generate a new symbolic key, as shown in STEP 904, and pairs the particular character with the new symbolic key, which represents the martial arts movement or the sequence of martial arts movement, as shown in STEP 905. Lastly, the martial arts movement-to-language character electronic symbolization and creation application program stores the newly-established data pair in a lookup table or in a database, with the particular character as an electronic symbolic value to the established symbolic key that represents the captured martial arts movement, as shown in STEP 906.

Figure 10:
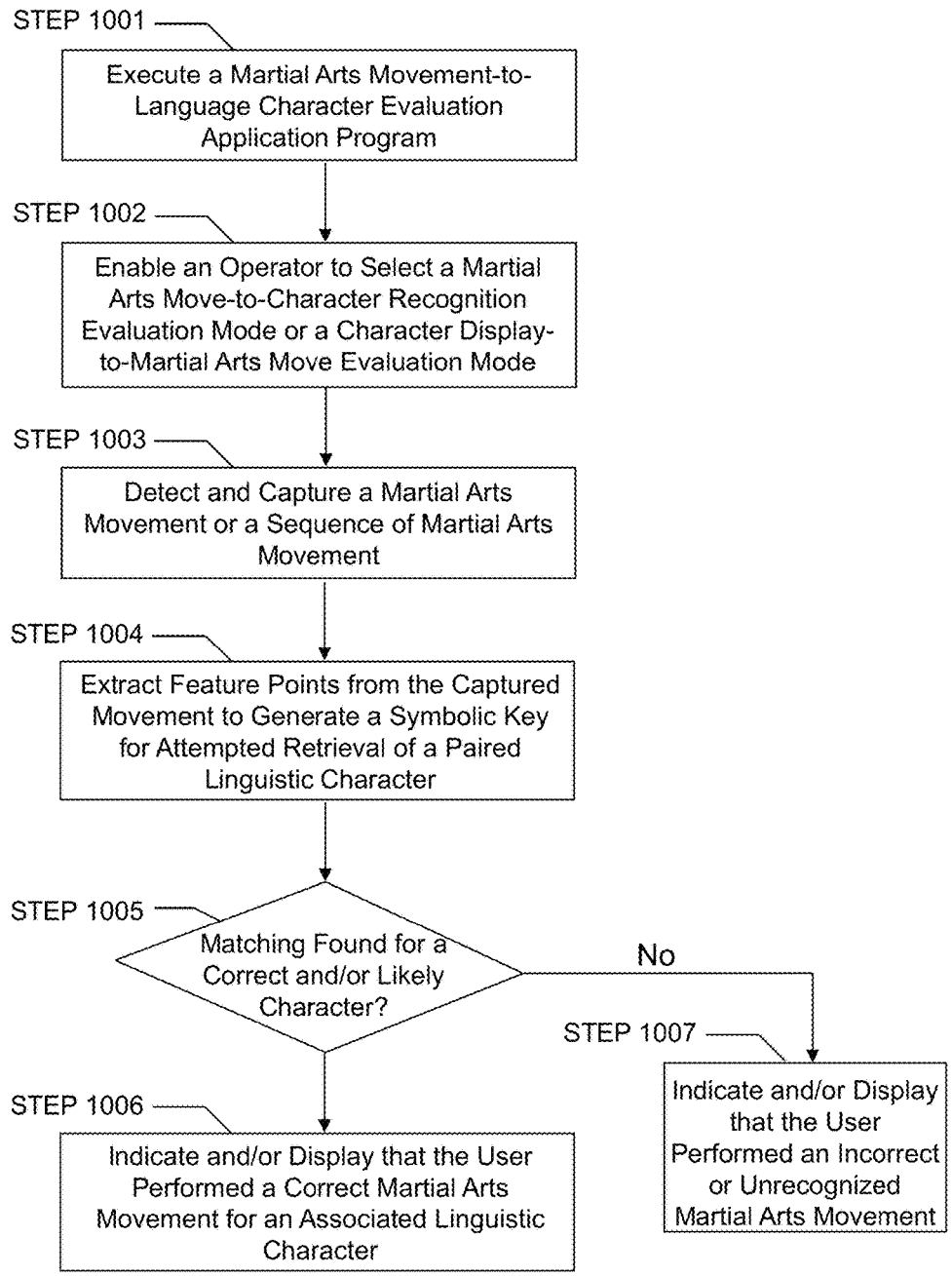
FIG. 10 shows an embodiment of an operational flowchart for martial arts movement-to-language character evaluation mode in an electronic language education system device, in accordance with an embodiment of the invention.

FIG. 10 shows an embodiment of an operational flowchart (1000) for martial arts movement-to-language character evaluation mode in an electronic language education system device, in accordance with an embodiment of the invention. First, the user executes a martial arts movement-to-language character evaluation application program in an electronic language education system device, as shown in STEP 1001. Then, the martial arts movement-to-language character evaluation application program, via a user interface, enables an operator to select a martial arts move-to-character recognition evaluation mode or a character display-to-martial arts move evaluation mode, as shown in STEP 1002.

Subsequently, the martial arts movement-to-language character evaluation mode in an electronic language education system device detects and captures a martial arts movement or a sequence of martial arts movement, as shown in STEP 1003, and extracts feature points from the captured movement to generate a symbolic key in an attempt to retrieve a paired linguistic character, as shown in STEP 1004. If a match is found for a correct and/or a likely-correct language character based on a literal symbolic matching or a probability analysis of symbolic similarities, as shown in STEP 1005, then the martial arts movement-to-language character evaluation application program can indicate and/or display that the user performed a correct martial arts movement for an associated linguistic character, as shown in STEP 1006. On the other hand, if the match is not found for the correct and/or the likely-correct language character, then the martial arts movement-to-language character evaluation application program can indicate and/or display that the user performed an incorrect or unrecognizable martial arts movement, as shown in STEP 1007.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electronic language education system device, the device comprising:

a martial arts movement linguistic symbolization module configured to record and convert a martial arts movement performer's martial arts movement routine as a first set of digitized computer graphics, and extract a first set of graphical feature points from the first set of digitized computer graphics to generate a benchmark digital symbolic key representing the martial arts movement performer's martial arts movement routine, wherein the benchmark digital symbolic key is subsequently paired with a language character and stored together in a lookup table or in a relational database during a martial arts movement-to-language character electronic symbolization and creation mode in the electronic language education system device;

a martial arts movement-to-language character evaluation module configured to record and convert a student's martial arts movement routine as a second set of digitized computer graphics, and extract a second set of graphical feature points from the second set of digitized computer graphics to generate an evaluation digital symbolic key representing the student's martial arts movement routine, wherein the evaluation digital symbolic key is entered into the lookup table or the relational database of the electronic language education system in an attempt to retrieve a corresponding language character as a return value, and wherein the martial arts movement-to-language evaluation module also provides a martial arts move-to-character recognition evaluation mode and a character display-to-martial arts move evaluation mode as two types of linguistic learning enhancement operating modes in the electronic language education system device;

a camera lens connected to a camera processing unit to capture one or more digitized images associated with the martial arts movement performer's martial arts movement routine and the student's martial arts movement routine;

a CPU and a memory unit to execute the martial arts movement linguistic symbolization module and the martial arts movement-to-language character evaluation module, wherein at least one module provides an electronic user interface to invoke the martial arts movement-to-language character electronic symbolization and creation mode from the martial arts movement linguistic symbolization module, and the martial arts move-to-character recognition evaluation mode and the character display-to-martial arts move evaluation mode as the two types of linguistic learning enhancement operating modes in the electronic language education system device from the martial arts movement-to-language character evaluation module; and a display panel connected to the CPU and the memory unit to display at least one of menu choices, language characters, symbolized and paired datasets, and evaluation feedback as part of the electronic user interface.

2. The electronic language education system device of claim 1, further comprising a motion sensor, a position sensor, an infrared sensor, or a human-limb movement sensor to additionally capture sensory parameters derived from the martial arts movement performer's martial arts movement routine and the student's martial arts movement routine.

3. The electronic language education system device of claim 1, wherein the martial arts movement-to-language character evaluation module includes a martial arts movement capture module, a martial arts movement analysis and feature point extraction module, a symbolic key generation module, a symbolized martial arts lookup table value retrieval and evaluation module, and a symbolized martial arts lookup table database.

4. The electronic language education system device of claim 1, wherein the electronic language education system device is a special-purpose language education set-top box, a tablet computer, a personal computer, a laptop computer, or a smart phone connected to the display panel.

5. The electronic language education system device of claim 1, further comprising a graphics unit including a graphics processor and a display driver, which are operatively connected to the display panel.

6. The electronic language education system device of claim 2, further comprising an external sensor interface connected to the motion sensor, the position sensor, the infrared sensor, or the human-limb movement sensor.

7. The electronic language education system device of claim 1, wherein the martial arts movement linguistic symbolization module includes a character database for a human language, a martial arts movement capture module, a martial arts movement feature point extraction module, a symbolic key generation module, and a symbolized martial arts lookup table database.

8. The electronic language education system device of claim 1, further comprising a power management unit and a power source to supply regulated electric power to the electronic language education system.

9. The electronic language education system device of claim 1, further comprising a digital signal processing unit and a wireless transceiver for cellular or wireless data access to a cloud network.

10. The electronic language education system device of claim 1, wherein the martial arts movement performer's martial arts movement routine resembles a pen stroke, a shape, or a form associated with the language character.

11. The electronic language education system device of claim 1, wherein the attempt to retrieve the corresponding language character as the return value is defined as successful if the return value exists in the lookup table or the relational database when the evaluation symbolic key is entered, or if the evaluation symbolic key is identical or similar to the benchmark symbolic key.

12. The electronic language education system device of claim 1, wherein the attempt to retrieve the corresponding language character as the return value is defined as unsuccessful if the return value does not exist in the lookup table or the relational database when the evaluation symbolic key is entered, or if the evaluation symbolic key does not resemble the benchmark symbolic key.

\* \* \* \* \*